US010929646B2

(12) United States Patent
Wang

(10) Patent No.: US 10,929,646 B2
(45) Date of Patent: Feb. 23, 2021

(54) METHOD AND APPARATUS FOR IMAGE PROCESSING, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Huichao Wang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 215 days.

(21) Appl. No.: 16/155,593

(22) Filed: Oct. 9, 2018

(65) Prior Publication Data
US 2019/0130166 A1 May 2, 2019

(30) Foreign Application Priority Data
Oct. 31, 2017 (CN) .......................... 201711040533.2

(51) Int. Cl.
G06K 9/00 (2006.01)
G06T 5/00 (2006.01)
(Continued)

(52) U.S. Cl.
CPC ..... G06K 9/00234 (2013.01); G06K 9/00268 (2013.01); G06K 9/00281 (2013.01);
(Continued)

(58) Field of Classification Search
CPC .......... G06K 9/00324; G06K 9/00268; G06K 9/00281; G06K 9/00604; G06K 9/6288;
(Continued)

(56) References Cited

U.S. PATENT DOCUMENTS 7,239,726 B2 * 7/2007 Li ..................... G06K 9/00268
382/117
8,908,904 B2 12/2014 Santos
(Continued)

FOREIGN PATENT DOCUMENTS

CN         1786980 A     6/2006
CN       102013011 A     4/2011
(Continued)

OTHER PUBLICATIONS

Seung-Tak Noh et al.( Retouch Transfer for 3D Printed Face Replica with Automatic Alignment), Yokohama, Japan, Jun. 27-30, 2017, 6 pages. . ACM. 978-1-4503-5228-4/17/06 DOI: 10.1145/3095140.3095164 . (Year: 2017).*

(Continued)

Primary Examiner — Ali Bayat
(74) Attorney, Agent, or Firm — Ladas & Parry, LLP

(57) ABSTRACT

The present disclosure relates to a method and apparatus for image processing, and a computer-readable storage medium. The method includes the following actions. Face recognition is performed on an image to be processed to recognize a face region in the image to be processed. Facial feature recognition points in the face region are acquired. Coordinate values of the facial feature recognition points in a coordinate system are acquired. Distances between the facial feature recognition points and angles of a coordinate axis of the coordinate system relative to lines each connecting two of the facial feature recognition points are determined according to the coordinate values. A deviation angle of the face region is determined according to the distances between the facial feature recognition points and the angles of the coordinate axis relative to the lines each connecting two of the facial feature recognition points. A retouching template (Continued)

corresponding to the deviation angle is acquired. The face region is retouched according to the retouching template.

18 Claims, 6 Drawing Sheets

(51) Int. Cl.
  *G06T 7/70* (2017.01)
  *G06T 5/50* (2006.01)
  *G06T 7/13* (2017.01)
  *G06K 9/62* (2006.01)

(52) U.S. Cl.
  CPC ....... *G06K 9/00604* (2013.01); *G06K 9/6288* (2013.01); *G06T 5/005* (2013.01); *G06T 5/50* (2013.01); *G06T 7/13* (2017.01); *G06T 7/70* (2017.01); *G06T 2207/10024* (2013.01); *G06T 2207/30201* (2013.01)

(58) Field of Classification Search
  CPC .. G06T 7/13; G06T 7/70; G06T 5/005; G06T 5/50; G06T 2207/30201; G06T 2207/10024; G06T 2207/10016; G06T 2207/20016; G06T 2207/20028
  USPC ......................................................... 382/118
  See application file for complete search history.

(56) References Cited

U.S. PATENT DOCUMENTS

| | | | |
|---|---|---|---|
| 2004/0022435 | A1 | 2/2004 | Ishida |
| 2006/0233422 | A1* | 10/2006 | Toyama .................... G06T 7/73 382/103 |
| 2013/0044947 | A1 | 2/2013 | Brandt |
| 2013/0044958 | A1 | 2/2013 | Brandt |
| 2013/0169827 | A1 | 7/2013 | Santos |
| 2013/0254500 | A1 | 9/2013 | Nakajima |
| 2015/0125030 | A1 | 5/2015 | Suzuki et al. |
| 2015/0254500 | A1 | 9/2015 | Izumi et al. |
| 2016/0335475 | A1* | 11/2016 | Krenzer .................... G06T 7/77 |
| 2018/0075665 | A1* | 3/2018 | Konoplev ............... G06T 11/00 |
| 2018/0225842 | A1* | 8/2018 | Wang ....................... G06T 7/73 |

FOREIGN PATENT DOCUMENTS

| | | |
|---|---|---|
| CN | 103793693 A | 5/2014 |
| CN | 104966267 A | 10/2015 |
| CN | 105760836 A | 7/2016 |
| CN | 105956576 A | 9/2016 |
| CN | 106446793 A | 2/2017 |
| CN | 106558025 A | 4/2017 |
| CN | 106791365 A | 5/2017 |
| CN | 106991367 A | 7/2017 |
| CN | 107818305 A | 3/2018 |
| WO | 2017124929 A1 | 7/2017 |

OTHER PUBLICATIONS

Second Office Action and search report of the Chinese application No. 201711040533.2, dated Jan. 7, 2020.
Seung-Tak Noh et al: "Retouch transfer for 3D printed face replica with automatic alignment", Jun. 27, 2017; Jun. 27, 2017-Jun. 30, 2017, Jun. 27, 2017(Jun. 27, 2017), p. 1-6, XP058370410, D01: 10.1145/3095140.3095164 ISBN:978-1-4503-5228-4 * Abstract; Section 3.1-3.3; figure 2, 4, 5, 6, 7, 8 *.
Yang Yue et al: "Semantic portrait color transfer with internet images", Multimedia Tools and Applications, Kluwer Academic Publishers, Boston, US, vol. 76, No. 1, Nov. 13, 2015 (Nov. 13, 2015), pp. 523-541, XP036161705, ISSN: 1380-7501, D01: 10.1007/S11042-015-3063-X(retrieved on Nov. 13, 2015) * Abstract; Section 3; Section 4; figures 3, 5, 6, 12 *.
Yichang Shih et al: "Style transfer for headshot potraits", ACM Transactions on Graphics (TOG), ACM, US, vol. 33, No. 4, Jul. 27, 2014 (Jul. 27, 2014), pp. 1-14, XP058051952, ISSN: 0730-0301, D01: 10.1145/2601097.2601137 * Section 3.; figures 3, 8 *.
Supplementary European Search Report and search opinion in European application No. 18199864.2, dated Mar. 25, 2019.
International Search Report in international application No. PCT/CN2018/110534, dated Jan. 17, 2019.
Written Opinion of the International Search Authority in international application No. PCT/CN2018/110534, dated Jan. 17, 2019.
First Office Action and Search Report of the Chinese application No. 201711040533.2, dated May 30, 2019.
Third Office Action of the Chinese application No. 201711040533.2, dated May 8, 2020.
First Office Action of the corresponding European application No. 18199864.2, dated Dec. 16, 2020.

* cited by examiner

METHOD AND APPARATUS FOR IMAGE PROCESSING, AND COMPUTER-READABLE STORAGE MEDIUM

CROSS-REFERENCE TO RELATED APPLICATION

The present application claims benefit of and priority to Chinese Patent Application 201711040533.2, filed on Oct. 31, 2017, the contents of which are hereby incorporated by reference in its entirety.

TECHNICAL FIELD

The present disclosure relates to the technical field of computers, and particularly to a method and apparatus for image processing, and an electronic device and a computer-readable storage medium.

BACKGROUND

With rapid development of electronic devices, the electronic devices have more and more functions. When a user takes a photo with an electronic device, the electronic device may perform operations such as automatic white balance and automatic exposure regulation, by detecting environmental light information. When the user shoots a portrait or a self-portrait with the electronic device, the electronic device may also perform a series of retouching operations such as whitening, buffing and acne removal on the portrait.

BRIEF DESCRIPTION OF DRAWINGS

In order to describe the technical solutions in the embodiments of the application or a conventional art more clearly, the drawings required to be used in the descriptions about the embodiments or the conventional art will be simply introduced below. It is apparent that the drawings described below are only some embodiments of the application, and those of ordinary skilled in the art may also obtain other drawings according to these drawings without creative work.

DETAILED DESCRIPTION

In order to make the purposes, technical solutions and advantages of the application clearer, the application will be further described below in combination with the drawings and the embodiments in detail. It should be understood that the specific embodiments described herein are only adopted to explain the application and not intended to limit the application.

Figure 1:
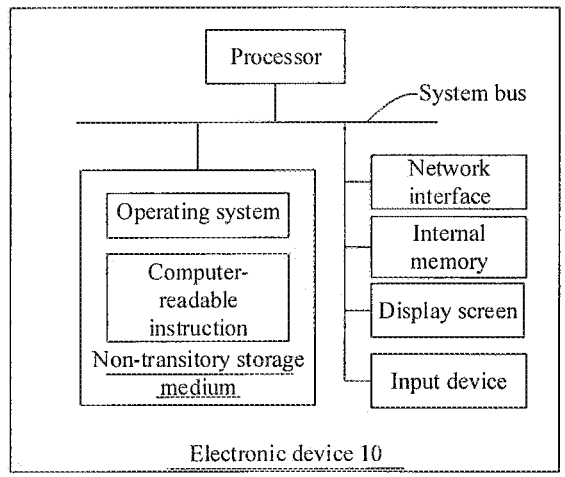
FIG. 1 illustrates an internal structure diagram of electronic device 10 according to an aspect of the disclosure.

FIG. 1 illustrates an internal structure diagram of electronic device 10 according to an embodiment. As illustrated in FIG. 1, the electronic device 10 includes a processor, non-transitory storage medium, internal memory, network interface, display screen and input apparatus which are connected through a system bus. The non-transitory storage medium of the electronic device 10 stores an operating system and a computer-readable instruction. The computer-readable instruction is executed by the processor to implement an image processing method. The processor is configured to provide a calculation and control capability to support running of the whole electronic device 10. The internal memory of the electronic device 10 provides an environment for running of the computer-readable instruction in the non-transitory storage medium. The network interface is configured to perform network communication with a server. The display screen of the electronic device 10 may be a liquid crystal display screen, an electronic ink display screen or the like. The input apparatus may be a touch layer covering the display screen. The input apparatus may also be a button, trackball or touchpad arranged on a housing of the electronic device 10. The input apparatus may further be an external keyboard, touchpad, mouse or the like. The electronic device 10 may be a mobile phone, a tablet computer, a personal digital assistant, wearable device or the like. It can be understood by those skilled in the art that the structure illustrated in FIG. 1 illustrates only a block diagram of a part of structure related to the solutions of the present disclosure and not intended to limit the electronic device 10 to which the solutions of the application are applied. The electronic device 10 is not limited to the structure illustrated in FIG. 1. Furthermore, the electronic device 10 may include more or fewer components, a combination of components or different component arrangements.

Figure 2:
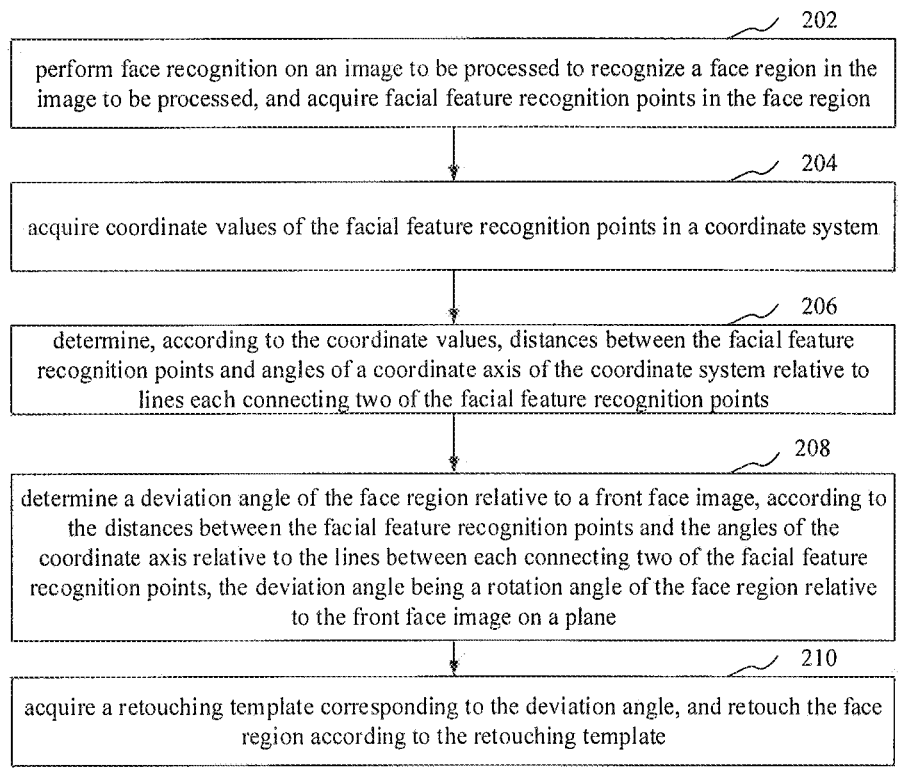
FIG. 2 illustrates a flowchart of an image processing method according to an embodiment.

FIG. 2 illustrates a flowchart of an image processing method according to an embodiment. As illustrated in FIG. 2, the image processing method includes the following actions.

In block 202, face recognition is performed on an image to be processed to recognize a face region in the image to be processed. Facial feature recognition points in the face region are acquired.

An electronic device may perform face recognition on the acquired image to be processed to detect whether the face region exists in the image to be processed. The image to be processed may be an image shot and acquired by the electronic device, an image stored by the electronic device and an image downloaded by the electronic device through a data network or a wireless local area network. The electronic device may perform face recognition on the image to be processed by adopting a face recognition algorithm. When the facial feature recognition points exists in the image to be processed, it is detected that a face exists in the image to be processed. A region occupied by a single face image in the image to be processed is a face region. When multiple faces exist in the image to be processed, multiple face regions exist in the image to be processed.

After recognizing the face region in the image to be processed, the electronic device may acquire the facial feature recognition points in the face region. The facial feature recognition points may be feature points of the five sense organs of the face. The facial feature recognition points may also be preset points in the face region.

In block 204, coordinate values of the facial feature recognition points in a coordinate system are acquired.

The electronic device may acquire the coordinate values of the facial feature recognition points in the face region. Specifically, the electronic device may represent the coordinate values of the facial feature recognition points with pixel positions corresponding to the facial feature recognition points. For example, the coordinate values are represented with the pixel positions, i.e., specific rows and specific columns.

In block 206, distances between the facial feature recognition points and angles of a coordinate axis of the coordinate system relative to lines each connecting two of the facial feature recognition points are determined according to the coordinate values.

The electronic device may determine the distances between the facial feature recognition points and the angles of the coordinate axis relative to the lines each connecting two of the facial feature recognition points according to the coordinate values of the facial feature recognition points. There are multiple facial feature recognition points in the face region. The electronic device may acquire the distances every two facial feature recognition points and angles of the coordinate axis relative to lines connecting between every two facial feature recognition points. The facial feature recognition points may correspond to multiple pixels in the image. The electronic device may select the pixels at central positions as reference points, to acquire the distances between the facial feature recognition points and angles of the coordinate axis relative to lines each connecting two of the facial feature recognition points. For example, a position of the left canthus of a human eye corresponds to pixels in a region from the 100th column to the 110th column and from the 100th row to the 110th row. Then the electronic device may select the pixel in the 105th row and the 105th column as a reference point. The electronic device calculates the distances and angles of the facial feature recognition points according to the reference point of each facial feature recognition point.

The electronic device may represent the distances between the facial feature recognition points with the numbers of the pixels. For example, a distance between the left canthus and the right canthus is 300 thousand pixel values. The electronic device may also establish a rectangular coordinate system in the image and acquire the angles of a coordinate axis of the rectangular coordinate system relative to lines each connecting two of the facial feature recognition points in the rectangular coordinate system. For example, the electronic device establishes the rectangular coordinate system with two straight lines forming a right angle with each other on the image and names the two straight lines after a positive direction and a negative direction. After acquiring a line segment formed by connecting the reference points corresponding to two facial feature recognition points, the electronic device may acquire acute angles formed by the line segment and the straight lines in the rectangular coordinate system and represent the angle between the facial feature recognition points with the acute angles. For example, the electronic device establishes an XY coordinate system with two straight lines perpendicular to each other in the image, divides the axis x into a positive axis and a negative axis and divides the axis y into a positive axis and a negative axis. Then, the electronic device represent the angle between the right canthus and nasal tip in the face with an included angle 80° between a line segment formed by the right canthus and nasal tip in the face and the positive axis of the axis x and an included angle 10° with the positive axis of the axis y.

In block 208, a deviation angle of the face region relative to the front face image is determined according to the distances between the facial feature recognition points and the angles of the coordinate axis relative to the lines each connecting two of the facial feature recognition points. The deviation angle is a rotation angle of the face region relative to the front face image on a plane.

A face is a three-dimensional structure and the face may rotate along different directions in a three-dimensional space. For example, upward and downward head nodding, leftward and rightward headshaking and the like all belong to rotation of the face in the three-dimensional space. After the face rotates in the three-dimensional space, two-dimensional images, presented in the image, of the face may also be different. A deviation angle of the face in the image may be detected by a software method, and then the retouching template may be correspondingly regulated according to the deviation angle of the face.

After acquiring the distances between the facial feature recognition points in the face region and the angles of the coordinate axis relative to the lines each connecting two of the facial feature recognition points, the electronic device may determine the deviation angle of the face region according to the distances between the facial feature recognition points and the angles of the coordinate axis relative to the lines each connecting two of the facial feature recognition points. The electronic device may acquire the deviation angle by means of artificial intelligence. The deviation angle of the face region refers to a rotation angle of the face region in the image relative to a standard face image. The standard face image is a front face image, i.e., an image shot when the face directly faces a camera. The deviation angle of the face region may be represented with three angles. Three straight lines perpendicular to each other in the three-dimensional space are intersected at a point to form a three-dimensional coordinate system, every two straight lines in the three straight lines may form a plane, and there are totally three planes. Then, the deviation angle of the face region is represented with rotation angles of the face region on the three planes relative to the standard face image.

In block 210, a retouching template corresponding to the deviation angle is acquired. The face region is retouched according to the retouching template.

After acquiring the deviation angle of the face region, the electronic device may acquire the retouching template corresponding to the deviation angle of the face region. The retouching template refers to a layer generated according to a retouching parameter. Different positions in this layer may correspond to different feature points in the face. The electronic device may add different colors in the layer. For example, positions corresponding to pupil regions are displayed in black for pupil retouching. A position corresponding to a lip region is displayed in red for displaying a lip color. Positions corresponding to cheekbone regions are displayed in red for displaying the red color of cheekbones. The electronic device may cover the face region on the original image with the layer generated according to the retouching parameter for retouching the face region. To use a common expression, the retouching template is similar to a transparent mask. The mask is coated with different colors. The mask may cover the face for displaying.

The retouching template pre-stored by the electronic device is a retouching template corresponding to the front of the face. After acquiring the deviation angle of the face region, the electronic device may acquire the template corresponding to the deviation angle. That is, the electronic device may acquire the retouching template corresponding to the two-dimensional image of the face after rotation.

After the electronic device acquires the retouching template corresponding to the deviation angle, the electronic device may retouch the face region in the image to be processed according to the retouching template. That is, the electronic device may superimpose the retouching template and the face region in the image to be processed. The electronic device may determine a position of the retouching template according to the facial feature recognition points in the face region.

According to an aspect, the electronic device may also directly retouch the face region in the image to be processed. Retouching includes: whitening, eye widening, acne removal, freckle removal, cheek color application, pupil retouching, lip gloss application and the like. Specifically, the electronic device may implement retouching by regulating color values of pixels in the face region, performing filtering processing on the face region and the like.

According to the method in the present disclosure, the deviation angle of the face region in the image is analyzed. The retouching template corresponding to the face region is acquired according to the deviation angle of the face region, so that the retouching template fits a face better. The following case due to non-correspondence between the retouching template and the face may be avoided: a special retouching effect is not presented in a corresponding region in the face. Therefore, the image may be retouched intelligently.

According to an aspect, the deviation angle includes a first angle, a second angle and a third angle. The first angle represents a rotation angle of the face region on a first plane relative to the standard face image. The second angle represents a rotation angle of the face region on a second plane relative to the standard face image. The third angle represents a rotation angle of the face region on a third plane relative to the standard face image. Every two planes of the first plane, the second plane and the third plane are perpendicular to each other.

Figure 3:
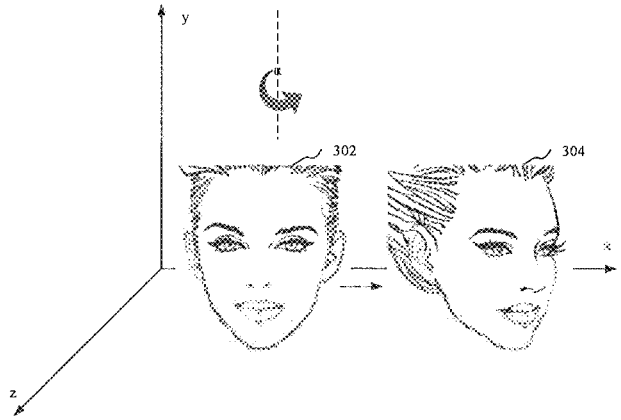
FIG. 3 illustrates a schematic diagram of face rotation in a space rectangular coordinate system according to an aspect of the disclosure.
Figure 4:
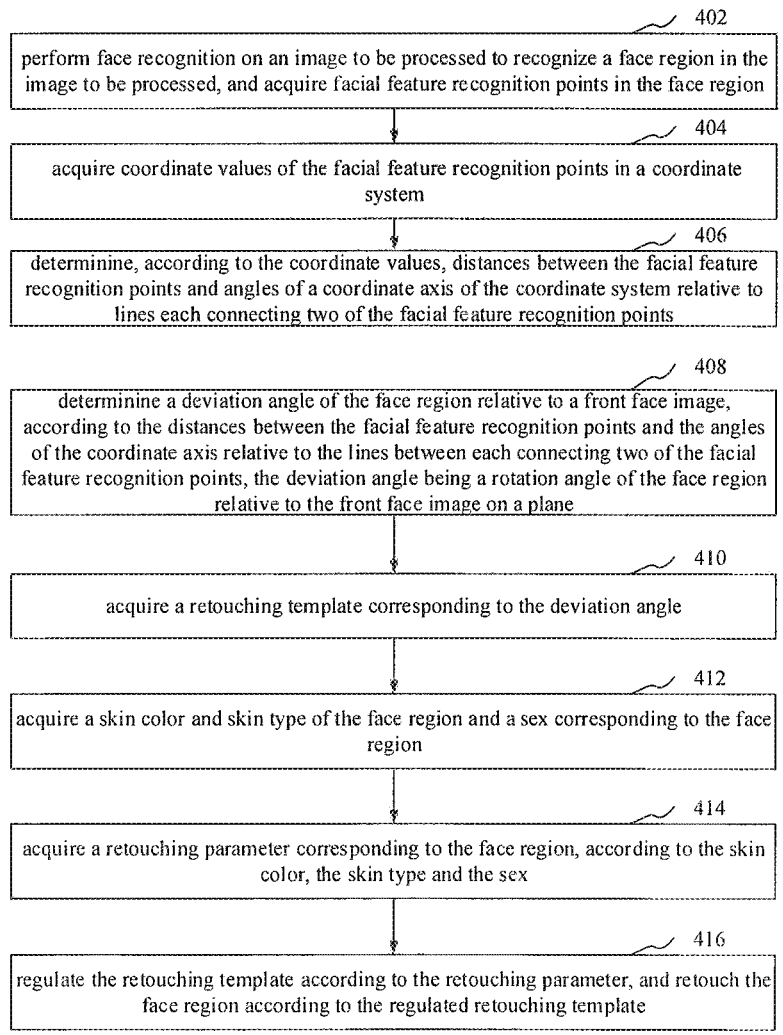
FIG. 4 illustrates a flowchart of an image processing method according to an aspect of the disclosure.
Figure 5:
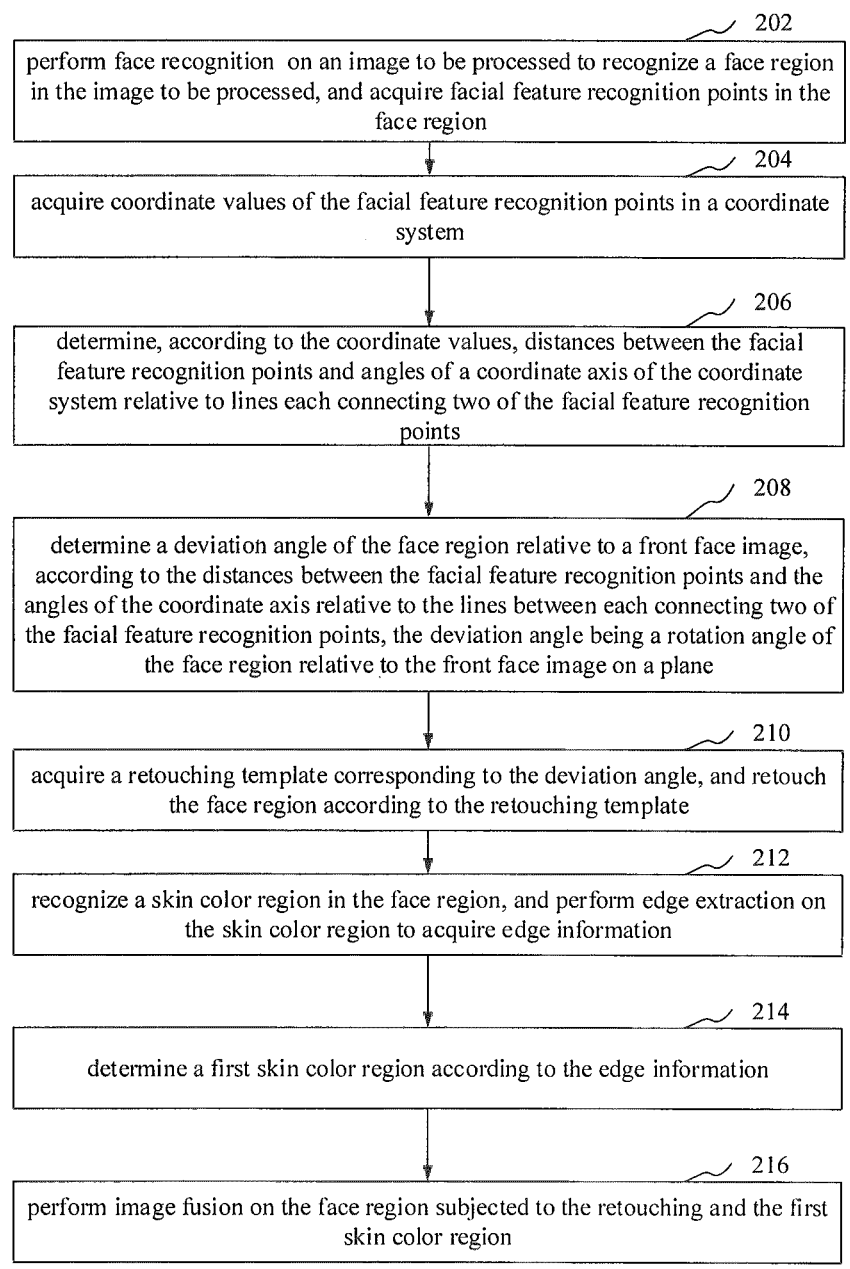
FIG. 5 illustrates a flowchart of an image processing method according to an aspect of the disclosure.
Figure 6:
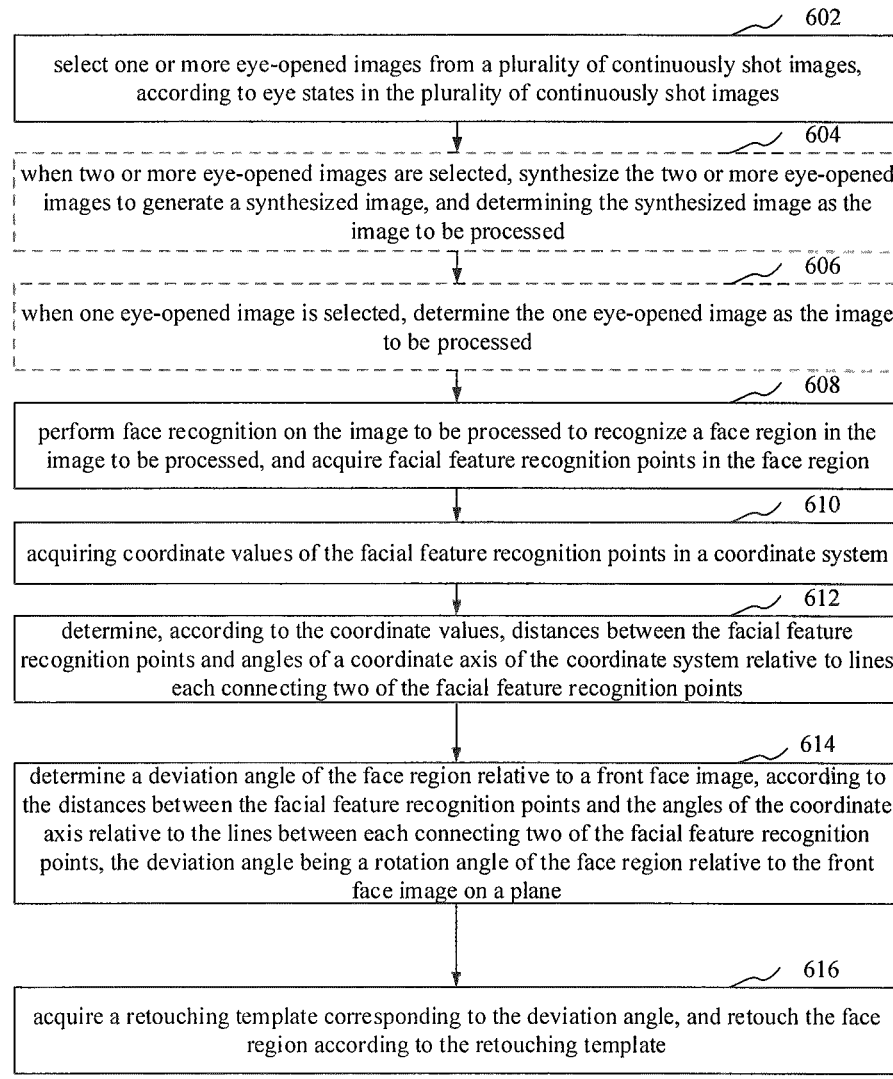
FIG. 6 illustrates a flowchart of an image processing method according to an aspect of the disclosure.

Since the face may rotate in the three-dimensional space, the two-dimensional images, presented on the image, of the face during rotation are different. When analyzing the deviation angle of the face relative to the standard face image, the electronic device may represent the deviation angle with three angles in the three-dimensional space. The standard face image is a two-dimensional face image shot when the face directly faces the camera. As illustrated in FIG. 3, three straight lines perpendicular to each other in the three-dimensional space are intersected at a point to form a space rectangular coordinate system, i.e., an XYZ coordinate system. In the system, the axis x and the axis y are intersected to form the first plane, the axis x and the axis z are intersected to form the second plane, and the axis y and the axis z are intersected to form the third plane. Every two planes of the first plane, the second plane and the third plane are perpendicular to each other. The first angle represents a rotation angle of the face region about the axis z relative to the standard face image. The second angle represents a rotation angle of the face region about the axis y relative to the standard face image. The third angle represents a rotation angle of the face region about the axis x relative to the standard face image. In FIG. 3, a first face 302 is a standard face image, i.e., a two-dimensional face image shot when the face directly faces the camera. After the first face 302 rotates anticlockwise about the axis y by an angle α, a second face 304 may be obtained, and a deviation angle of the second face 304 relative to the first face 302 includes a first angle θ, a second angle α and a third angle θ.

When recording the first angle, second angle and third angle corresponding to the deviation angle, the electronic device may set positive rotation directions on the first plane, the second plane and the third plane respectively and represent the first angle, the second angle and the third angle with rotation angles of the face region in the positive rotation directions relative to the standard face image. For example, for the second angle, an anticlockwise direction is the positive rotation direction, and when the face region rotates anticlockwise by β relative to the standard face image, the second angle is β, and when the face region rotates clockwise by γ relative to the standard face image, the second angle is −γ.

According to the method of the present disclosure, the deviation angle of the face region relative to the standard face image is split into the rotation angles in the three planes perpendicular to each other, and a complex three-dimensional change is split into each plane of the three planes, so that analysis of the electronic device on the deviation angle of the face is facilitated.

According to an embodiment, the operation that the retouching template corresponding to the deviation angle is acquired includes any one of the following actions.

(1) The electronic device pre-stores a standard retouching template and rotates the standard retouching template according to the deviation angle to obtain the retouching template corresponding to the deviation angle.

The standard retouching template is pre-stored in the electronic device. The standard retouching template is a retouching template corresponding to the standard face image. The face shot when the face directly faces the camera is the standard face image, i.e., the front of the face. The standard retouching template is a retouching template corresponding to the front of the face. After acquiring the deviation angle of the face region relative to the standard face image, the electronic device may rotate the standard retouching template according to the deviation angle. The deviation angle of the face region relative to the standard face image may be represented with the first angle, second angle and third angle in the space coordinate system. When rotating the standard retouching template according to the deviation angle, the electronic device may rotate the standard retouching template in the space coordinate system according to the first angle, the second angle and the third angle to obtain the retouching template corresponding to the deviation angle.

(2) The electronic device searches stored retouching templates for the retouching template corresponding to the deviation angle.

Retouching templates corresponding to different deviation angles may be stored in the electronic device. After acquiring the deviation angle of the face region relative to the standard face image, a mobile terminal may search the retouching templates stored by the electronic device to determine whether there is a retouching template corresponding to the deviation angle of the face region relative to the standard face image. When determining there is a retouching template corresponding to the deviation angle of the face region relative to the standard face image, the electronic device may directly acquire the retouching template corresponding to the deviation angle of the face region relative to the standard face image.

(3) The electronic device uploads the deviation angle to a server, and receives, from the server, the retouching template corresponding to the deviation angle.

After acquiring the deviation angle of the face region relative to the standard face image, the electronic device may upload the deviation angle to the server. The retouching templates corresponding to different deviation angles are stored in the server, and if finding the retouching template corresponding to the deviation angle of the face region relative to the standard face image, the server returns the found retouching template to the electronic device. After the electronic device acquires the deviation angle, the standard retouching template may also be rotated according to the deviation angle, and the retouching template generated by rotation is returned to the electronic device, wherein the standard retouching template is the retouching template corresponding to the standard face image. A method by which the server rotates the standard retouching template is the same as a method by which the electronic device rotates the standard retouching template.

According to the method of the disclosure, after the deviation angle of the face region relative to the standard face image is acquired, the electronic device may acquire the retouching template corresponding to the deviation angle, and the face region in the image to be processed is retouched according to the retouching template corresponding to the deviation angle, so that the face region in the image to be processed is retouched more intelligently.

According to an aspect of the disclosure, an image processing method includes the following actions.

In block 402, face recognition is performed on an image to be processed to recognize a face region in the image to be processed. Facial feature recognition points in the face region are acquired.

In block 404, coordinate values of the facial feature recognition points in a coordinate system are acquired.

In block 406, distances between the facial feature recognition points and angles of a coordinate axis of the coordinate system relative to lines each connecting two of the facial feature recognition points are determined according to the coordinate values.

In block 408, a deviation angle of the face region is determined according to the distances between the facial feature recognition points and the angles of the coordinate axis relative to the lines each connecting two of the facial feature recognition points. The deviation angle is a rotation angle of the face region relative to the front face image on a plane.

In block 410, a retouching template corresponding to the deviation angle is acquired.

In block 412, a skin color and skin type of the face region and a sex corresponding to the face region are acquired.

The electronic device may recognize the skin color and skin type of the face region and the sex corresponding to a face in the face region. The electronic device represents the skin color of the face region with a color value of a skin color region. The electronic device may determine a level of the skin type through the numbers of wrinkles, freckles and acnes in the face region. The electronic device may recognize the sex corresponding to the face through a machine learning model.

In block 414, a retouching parameter corresponding to the face region is acquired according to the skin color, the skin type and the sex.

For different skin colors, skin types and sexes, the electronic device may match different retouching parameters. For example, when a face image of a female in the image is retouched, the electronic device may regulate a skin color, lip color, pupil color, cheek color and the like of the face image. When a face image of a male in the image is retouched, the electronic device only regulates a skin color and pupil color in the face image. A corresponding relationship between a skin color, a skin type, a sex and a retouching parameter may be pre-stored in the electronic device. After acquiring the skin color, skin type and sex of the face image, the electronic device may search for the corresponding retouching parameter. The electronic device may also search for the retouching parameter corresponding to the skin color, skin type and sex of the face image through the machine learning model.

In block 416, the retouching template is regulated according to the retouching parameter. The face region is retouched according to the regulated retouching template.

After acquiring the retouching parameter corresponding to the face region, the electronic device may regulate the retouching template according to the acquired retouching parameter. The regulated retouching template refers to replacing the retouching parameter with an original parameter of the retouching template.

According to the method of the disclosure, the electronic device may search for the corresponding retouching parameter according to the skin color, skin type and parameter of the face region in the image and may implement different retouching processing on different face regions, so that the image is retouched in a more personalized manner.

According to an aspect of the disclosure, after block 210, the method further includes the following actions.

In block 212, a skin color region in the face region is recognized. Edge extraction is performed on the skin color region to acquire edge information.

After acquiring the face region in the image to be processed, the electronic device may recognize the skin color region in the face region, and the skin color region is a region covered by skin in the face. The electronic device may recognize the skin color region through a color value of each pixel in the face region. Specifically, the electronic device may pre-store a color value of the skin color, the electronic device compares the color value of each pixel in the face region with the color value of the skin color, and when a color difference value between the color value of a pixel and the color value of the skin color is smaller than a specified threshold value, determines that two colors are relatively close, recognizes the color of the pixel in the face region as the skin color, and a region displayed by a set of the pixels of which the colors are the skin color is the skin color region.

After acquiring the skin color region in the face region, the electronic device may perform edge detection on the skin color region to acquire the edge information in the skin color region. Edge detection refers to recognizing a point of which brightness changes obviously in the image during image processing, for example, a texture on a surface of an object and a shape of the surface of the object. The edge information is contour information in the skin color region. The electronic device may perform edge detection to recognize a skin texture, a contour of an acne, a contour of a freckle, a contour of a scar and the like in the skin color region.

In block 214, a first skin color region is determined according to the edge information.

After the electronic device acquires the edge information in the skin color region, the electronic device may determine the first skin color region according to the edge information. The first skin color region is a delicate skin region. The electronic device, after acquiring the edge information, may acquire, according to the contour of the acne, the contour of the freckle and the contour of the scar, the an acne region, freckle region and scar region to be removed. Then the electronic device removes the acne region, the freckle region and the scar region from the skin color region to obtain the first skin color region. The operation that the electronic device removes the acne region, the freckle region and the scar region from the skin color region refers to that the electronic device crops an image of the acne region, an image of the freckle region and an image of the scar region from an image of the skin color region.

In block 216, image fusion is performed on the retouched face region and the first skin color region.

After retouching the face region in the image to be processed, the electronic device may perform image fusion on the retouched face region in the image and the first skin color region. Specifically, the electronic device may regulate a skin color of the first skin color region according to the skin color of the retouched face region and then superimpose the regulated first skin color region and the retouched face region. Then the electronic device performs transition processing on an edge of a superimposed region. The electronic device may perform feathering processing and ramp shading on the edge of the superimposed region to implement transition processing. The electronic device may also perform gradient transparency regulation on the first skin color region to implement transition processing on the superimposed region.

According to the method of the present disclosure, before the face region in the image is retouched, a specific skin color region in the face region is recognized and stored according to the edge information. Then image fusion is performed on the retouched face region and the specific color skin region. Therefore, details of an original skin texture and the like may be reserved in the retouched face region. The retouched image is more real, and the impression of the image is improved.

According to an aspect of the disclosure, the operation that the first skin color region is determined according to the edge information includes the following actions. First edge information is determined according to a shape and color corresponding to the edge information. A skin color region corresponding to the first edge information is acquired as the first skin color region. Position information of the first skin color region is recorded.

After acquiring the edge information, the electronic device may determine a type of the edge information according to the shape, color and brightness corresponding to the edge information. The edge information is contour information in the skin color region, and the shape corresponding to the edge information is a shape of the contour. For example, the contour of the freckle region is approximate to an ellipse, and a contour of the skin texture is approximate to a straight line. If the contours in the edge information are connected into an enclosed image, the electronic device may detect a color and brightness in the enclosed image, for example, a color and brightness of the freckle region and a color and brightness of the acne region. After acquiring the shape, color and brightness corresponding to the edge information, the electronic device may recognize the type of the edge information. Shape, color and brightness information corresponding to different types of edge information is pre-stored in the electronic device. The electronic device may determine the type of the edge information by comparing the shape, color and brightness corresponding to the edge information. According to an aspect of the disclosure, the electronic device may also recognize the type of the edge information through a neural network model. The electronic device may select edge information corresponding to the skin texture as the first edge information. The skin color region corresponding to the first edge information is the first skin color region. After acquiring the first skin color region, the electronic device may record the position information of the first skin color region. The operation that the electronic device records the position information of the first skin color region includes the following action. The electronic device records coordinate values of pixels in the first skin color region, for example, the third row and the third column.

The operation that image fusion is performed on the retouched face region and the first skin color region includes the following action. A corresponding color skin region of the first skin color region in the processed face region is determined according to the position information, and fusion processing is performed on the first skin color region and the corresponding skin color region.

After acquiring the position information of the first skin color region, the electronic device may search the retouched face region for the corresponding skin color region according to the position information of the first skin color region. This action may include the following actions. The electronic device searches a corresponding coordinate value in the retouched face region according to a coordinate value of the first skin color region and then detects whether a corresponding region in the retouched face region is a skin color region. The electronic device may detect whether a present pixel is of the skin color or not according to the color value of the pixel. For example, if the coordinate value of a pixel in the first skin color region is the third row and the third column, the electronic device searches for the pixel in the third row and the third column in the retouched face region and detects whether the pixel in the third row and the third column in the retouched face region is of the skin color.

The electronic device may change a display region of the face region when retouching the face region in the image to be processed. For example, the corresponding region of the first skin color region in the processed face region may not be the skin color region after operations of eye widening, face-lift and the like are performed on the face region. Accordingly, the electronic device does not process the first skin color region.

After acquiring the corresponding skin color region of the first skin color region in the processed face region, the electronic device may perform fusion processing on the first skin color region and the corresponding skin color region. Before fusion processing, the electronic device may regulate the color, brightness and transparency of the first skin color region according to the corresponding skin color region in the processed face region.

According to the method of the disclosure, the electronic device may fuse the original skin color region in the face and the retouched face region. Thus, the retouched face region is also endowed with detail features, the retouched image is prevented from distortion, and aesthetics of the image is improved.

According to an aspect of the disclosure, before the operation that face recognition is performed on the image to be processed, the method further includes the following actions.

In block 602, one or more eye-opened images are selected from multiple continuously shot images according to eye states in the multiple continuously shot images.

The continuously shot images refer to images which are continuously and rapidly shot from the same direction and the same angle. Under a normal condition, the continuously shot images are relatively high in similarity. The multiple continuously shot images may be images shot and acquired by the electronic device and may also be images acquired by the electronic device in a network transmission manner. After acquiring the multiple continuously shot face images, the electronic device may extract facial feature points in the face images, for example feature points of the five sense organs of the face. The electronic device may mark position information of facial features according to the facial feature points, for example, recognizing positions of eyes according to eyeball feature points of the face. After acquiring the facial feature points, the electronic device may extract eye features in the face and then determine an eye-opened image according to the eye features. The eye-opened image is an image where the eyes in the image are both opened. The eye features may include: an eyeball shape, an eyeball position, an eyeball area, a line-of-sight direction, a pupil height, an eye white area and the like. A judgment condition corresponding to the eye features may be preset in the electronic device. After acquiring the eye features, the electronic device may compare the eye features with the preset judgment condition one by one to judge whether the face image is an eye-opened image. For example, when it is detected that the eyeball area of the face in the face image is larger than a first threshold value, it is determined that the face is in an eye-opened state, and the image is an eye-opened image. Or, when it is detected that the pupil height of the face in the face image is within a preset range, it is determined that the face is in the eye-opened state, and the image is an eye-opened image.

In block 604, when more than two eye-opened images are selected, the more than two eye-opened images are synthesized to generate a synthesized image, and the synthesized image is determined as the image to be processed.

When more than two eye-opened images are selected from the multiple continuously shot images, the electronic device may synthesize the more than two eye-opened images to generate a synthesized image and determine the synthesized image as the image to be processed. By image synthesis, noise in the image may be reduced, and quality of the image may be improved.

In block 606, when one eye-opened image is selected from the multiple continuously shot images, the eye-opened image is determined as the image to be processed.

In block 608, face recognition is performed on the image to be processed to recognize the face region in the image to be processed, and the facial feature recognition points in the face region are acquired.

In block 610, the coordinate values of the facial feature recognition points in a coordinate system are acquired.

In block 612, the distances between the facial feature recognition points and the angles of a coordinate axis relative to the coordinate system relative to lines each connecting two of the facial feature recognition points are determined according to the coordinate values.

In block 614, the deviation angle of the face region relative to the front face image is determined according to the distances between the facial feature recognition points and the angles of the coordinate axis relative to the lines each connecting two of the facial feature recognition points. The deviation angle is a rotation angle of the face region relative to the front face image on a plane.

In block 616, the retouching template corresponding to the deviation angle is acquired. The face region is retouched according to the retouching template.

According to the method of the disclosure, the electronic device selects the multiple continuously shot images, and only acquires the eye-opened image in the multiple images as the image to be processed, namely selecting an image with higher aesthetics from the multiple images for retouching. Thus, an image processing process is more intelligent, and user stickiness is improved.

Figure 7:
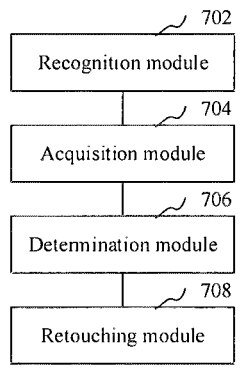
FIG. 7 illustrates a structure block diagram of an image processing apparatus according to an aspect of the disclosure.

FIG. 7 illustrates a structure block diagram of an image processing apparatus according to an embodiment. As illustrated in FIG. 7, the image processing apparatus includes a recognition module 702, an acquisition module 704, a determination module 706 and a retouching module 708.

The recognition module 702 is configured to perform face recognition on an image to be processed to recognize a face region in the image to be processed.

The acquisition module 704 is configured to acquire facial feature recognition points in the face region and acquire coordinate values of the facial feature recognition point in a coordinate system.

The determination module 706 is configured to determine distances between the facial feature recognition points and angles of a coordinate axis of the coordinate system relative to lines each connecting two of the facial feature recognition points according to the coordinate values, and determine a deviation angle of the face region relative to the front face image according to the distances between the facial feature recognition points and the angles of the coordinate axis relative to the lines each connecting two of the facial feature recognition points. The deviation angle is a rotation angle of the face region relative to the front face image on a plane.

The retouching module 708 is configured to acquire a retouching template corresponding to the deviation angle and retouch the face region according to the retouching template.

According to an aspect of the disclosure, the deviation angle includes a first angle, a second angle and a third angle. The first angle represents a rotation angle of the face region on a first plane relative to a standard face image. The second angle represents a rotation angle of the face region on a second plane relative to the standard face image. The third angle represents a rotation angle of the face region on a third plane relative to the standard face image. Every two planes of the first plane, the second plane and the third plane are perpendicular to each other.

According to an aspect of the disclosure, the operation that the retouching template 708 acquires the retouching template corresponding to the deviation angle includes any one of the following the following actions.

(1) The electronic device pre-stores a standard retouching template and rotates the standard retouching template according to the deviation angle to obtain the retouching template corresponding to the deviation angle.

(2) The electronic device searches stored retouching templates for the retouching template corresponding to the deviation angle. Or (3) The electronic device uploads the deviation angle to a server, and receives, from the server, the retouching template corresponding to the deviation angle.

According to an aspect of the disclosure, the recognition module 702 is further configured to recognize a skin color region in the face region and perform edge extraction on the skin color region to acquire edge information.

The determination module 706 is further configured to determine a first skin color region according to the edge information.

The retouching module 708 is further configured to perform image fusion on the retouched face region and the first skin color region.

According to an aspect of the disclosure, the operation that the determination module 706 determines the first skin color region according to the edge information includes that: first edge information is determined according to a shape and color corresponding to the edge information. A skin color region corresponding to the first edge information is acquired as the first skin color region. Position information of the first skin color region is recorded. The operation that the retouching module 708 performs image fusion on the retouched face region and the first skin color region includes the following action. A corresponding skin color region of the first skin color region in the processed face region is determined according to the position information.

Fusion processing is performed on the first skin color region and the corresponding skin color region.

Figure 8:
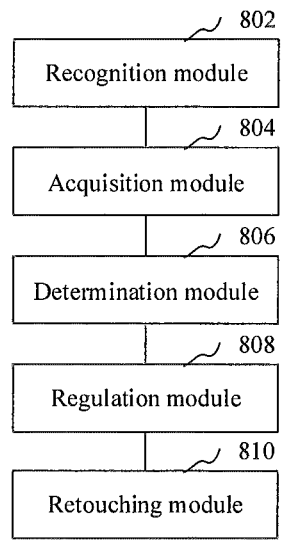
FIG. 8 illustrates a structure block diagram of an image processing apparatus according to an aspect of the disclosure.

FIG. 8 illustrates a structure block diagram of an image processing module according to another embodiment. As illustrated in FIG. 8, the image processing module includes a recognition module 802, an acquisition module 804, a determination module 806, a regulation module 808 and a retouching module 810. The recognition module 802, the acquisition module 804, the determination module 806 and the retouching module 810 have functions the same as those of the corresponding modules in FIG. 7.

The acquisition module 804 is configured to, before a face region is retouched according to a retouching template, acquire a skin color and skin type of the face region and a sex corresponding to the face region and acquire a retouching parameter corresponding to the face region according to the skin color, the skin type and the sex.

The regulation module 808 is configured to regulate the retouching template according to the retouching parameter.

The retouching module 810 is configured to retouch the face region according to the regulated retouching template.

Figure 9:
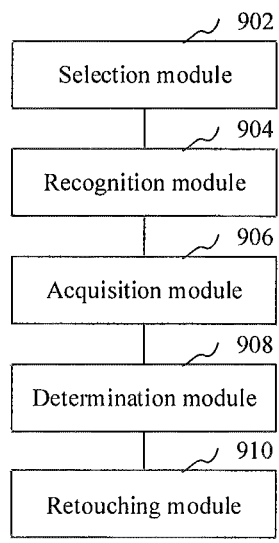
FIG. 9 illustrates a structure block diagram of an image processing apparatus according to an aspect of the disclosure.

FIG. 9 illustrates a structure block diagram of an image processing module according to another embodiment. As illustrated in FIG. 9, the image processing module includes a selection module 902, a recognition module 904, an acquisition module 906, a determination module 908 and a retouching module 910. The recognition module 904, the acquisition module 906, the determination module 908 and the retouching module 910 have functions the same as those of the corresponding modules in FIG. 7.

The selection module 902 is configured to, before face recognition is performed on an image to be processed, select one or more eye-opened images from multiple continuously shot images according to eye states in the multiple continuously shot images; when more than two eye-opened images are selected, synthesize the more than two eye-opened images to generate a synthesized image and determine the synthesized image as the image to be processed; when one eye-opened image is selected, determine the eye-opened image as the image to be processed.

Each module in the image processing apparatus is divided only for exemplary description. The image processing apparatus may be divided into different modules according to a requirement to realize all or part of functions of the image processing apparatus.

An aspect of the disclosure further provides a computer-readable storage medium, which is a non-transitory computer-readable storage medium including one or more compute-executable instructions. The compute-executable instructions are executed by one or more processors to cause the processors to execute the following actions.

(1) Face recognition is performed on an image to be processed to recognize a face region in the image to be processed. Facial feature recognition points in the face region are acquired.

(2) Coordinate values of the facial feature recognition points in a coordinate system are acquired.

(3) Distances between the facial feature recognition points and angles of a coordinate axis of the coordinate system relative to lines each connecting two of the facial feature recognition points are determined according to the coordinate values.

(4) A deviation angle of the face region relative to the front image is determined according to the distances between the facial feature recognition points and the angles of the coordinate axis relative to the lines each connecting two of the facial feature recognition points. The deviation angle is a rotation angle of the face region relative to the front face image on a plane.

(5) A retouching template corresponding to the deviation angle is acquired, and the face region is retouched according to the retouching template.

According to an aspect of the disclosure, the deviation angle includes a first angle, a second angle and a third angle. The first angle represents a rotation angle of the face region on a first plane relative to a standard face image. The second angle represents a rotation angle of the face region on a second plane relative to the standard face image. The third angle represents a rotation angle of the face region on a third plane relative to the standard face image. Every two planes of the first plane, the second plane and the third plane are perpendicular to each other.

According to an aspect, the action, executed by the processors, that the retouching template corresponding to the deviation angle is acquired includes any one of the following actions.

(1) Electronic device pre-stores a standard retouching template and rotates the standard retouching template according to the deviation angle to obtain the retouching template corresponding to the deviation angle.

(2) The electronic device searches stored retouching templates for the retouching template corresponding to the deviation angle.

(3) The electronic device uploads the deviation angle to a server, and receives, from the server, the retouching template corresponding to the deviation angle.

According to aspect of the disclosure, the operation that the face region is retouched according to the retouching template includes the following actions. A skin color and skin type of the face region and a sex corresponding to the face region are acquired. A retouching parameter corresponding to the face region is acquired according to the skin color, the skin type and the sex. The retouching template is regulated according to the retouching parameter, and the face region is retouched according to the regulated retouching template.

According to an aspect of the disclosure, the following actions are further performed. A skin color region in the face region is recognized, and edge extraction is performed on the skin color region to acquire edge information. A first skin color region is determined according to the edge information. Image fusion is performed on the retouched face region and the first skin color region.

According to an aspect of the disclosure, the operation that the first skin color region is determined according to the edge information includes the following actions. First edge information is determined according to a shape and color corresponding to the edge information. A skin color region corresponding to the first edge information is acquired as the first skin color region. Position information of the first skin color region is recorded. The operation that image fusion is performed on the retouched face region and the first skin color region includes the following actions. A corresponding skin color region of the first skin color region in the processed face region is determined according to the position information. Fusion processing is performed on the first skin color region and the corresponding skin color region.

According to an aspect of the disclosure, before the operation that face recognition is performed on the image to be processed, the following actions are further performed. One or more eye-opened images are selected from multiple continuously shot images according to eye states in the multiple continuously shot images. When two or more eye-opened images are selected, the two or more eye-opened images are synthesized to generate a synthesized image, and the synthesized image is determined as the image to be processed. When one eye-opened image is selected, the eye-opened image is determined as the image to be processed.

The disclosure further provides a computer program product including an instruction. The computer program product runs on a computer to cause the computer to execute the following actions.

(1) Face recognition is performed on an image to be processed to recognize a face region in the image to be processed. Facial feature recognition points in the face region are acquired.

(2) Coordinate values of the facial feature recognition point in a coordinate system are acquired.

(3) Distances between the facial feature recognition points and angles of a coordinate axis of the coordinate system relative to lines each connecting two of the facial feature recognition points are determined according to the coordinate values.

(4) A deviation angle of the face region is determined according to the distances between the facial feature recognition points and the angles of the coordinate axis relative to the lines each connecting two of the facial feature recognition points.

(5) A retouching template corresponding to the deviation angle is acquired, and the face region is retouched according to the retouching template.

According to an aspect of the disclosure, the deviation angle includes a first angle, a second angle and a third angle. The first angle represents a rotation angle of the face region on a first plane relative to a standard face image. The second angle represents a rotation angle of the face region on a second plane relative to the standard face image. The third angle represents a rotation angle of the face region on a third plane relative to the standard face image. Every two planes in the first plane, the second plane and the third plane are perpendicular to each other.

According to an aspect of the disclosure, the action, performed by a processor, that the retouching template corresponding to the deviation angle is acquired includes any one of the following actions.

(1) An electronic device pre-stores a standard retouching template and rotates the standard retouching template according to the deviation angle to obtain the retouching template corresponding to the deviation angle.

(2) The electronic device searches stored retouching templates for the retouching template corresponding to the deviation angle. Or (3) The electronic device uploads the deviation angle to a server, and receives, from the server, the retouching template corresponding to the deviation angle.

According to an aspect of the disclosure, the operation that the face region is retouched according to the retouching template includes the following actions. A skin color and skin type of the face region and a sex corresponding to the face region are acquired. A retouching parameter corresponding to the face region is acquired according to the skin color, the skin type and the sex. The retouching template is regulated according to the retouching parameter. The face region is retouched according to the regulated retouching template.

According to an aspect of the disclosure, the following actions are further executed. A skin color region in the face region is recognized, and edge extraction is performed on the skin color region to acquire edge information. A first skin color region is determined according to the edge information. Image fusion is performed on the retouched face region and the first skin color region.

According to an aspect of the disclosure, the operation that the first skin color region is determined according to the edge information includes the following actions. First edge information is determined according to a shape and color corresponding to the edge information. A skin color region corresponding to the first edge information is acquired as the first skin color region. Position information of the first skin color region is recorded. The operation that image fusion is performed on the retouched face region and the first skin color region includes the following actions. A corresponding skin color region of the first skin color region in the processed face region is determined according to the position information. Fusion processing is performed on the first skin color region and the corresponding skin color region.

According to an aspect of the disclosure, before the operation that face recognition is performed on the image to be processed, the following actions are further performed. One or more eye-opened images are selected from multiple continuously shot images according to eye states in the multiple continuously shot images. When two or more eye-opened images are selected, the two or more eye-opened images are synthesized to generate a synthesized image, and the synthesized image is determined as the image to be processed. When one eye-opened image is selected, the eye-opened image is determined as the image to be processed.

Figure 10:
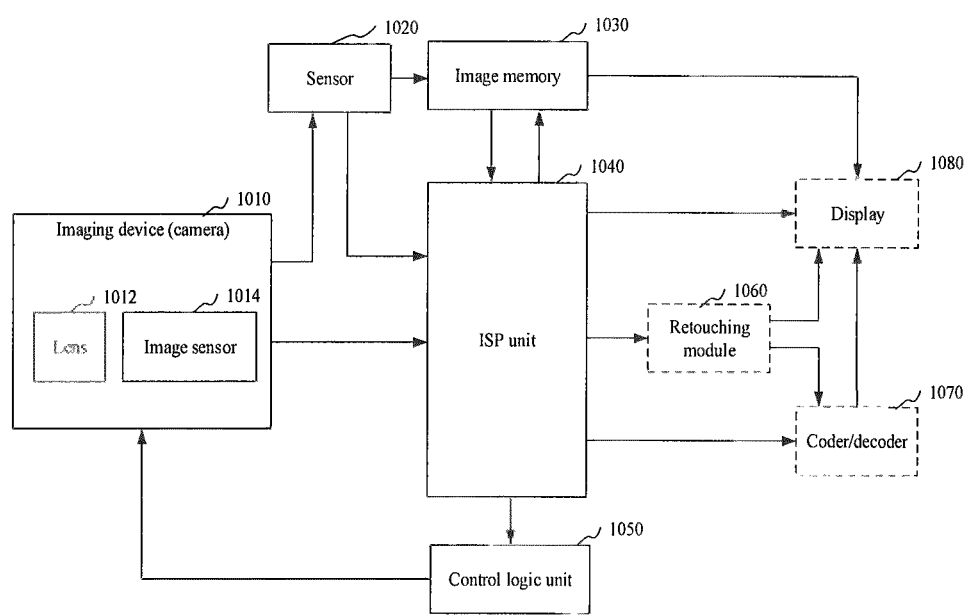
FIG. 10 illustrates a schematic diagram of an image processing circuit according to an aspect of the disclosure.

For example, electronic device is a mobile terminal. An aspect of the disclosure further provides a mobile terminal. The mobile terminal includes an image processing circuit. The image processing circuit may be implemented by virtue of hardware and/or software components and may include various processing units defining an Image Signal Processing (ISP) pipeline. FIG. 10 illustrates a schematic diagram of an image processing circuit according to an embodiment. As illustrated in FIG. 10, each aspect of an image processing technology related to the disclosure is illustrated only, for convenient description.

As illustrated in FIG. 10, the image processing circuit includes an ISP unit 1040 and a control logic unit 1050. Image data captured by imaging device 1010 is processed by the ISP unit 1040 at first, and the ISP unit 1040 analyzes the image data to capture image statistical information configurable to determine one or more control parameters of at least one of the ISP unit 1040 or the imaging device 1010.

The imaging device 1010 may include a camera with one or more lenses 1012 and an image sensor 1014. The image sensor 1014 may include a color filter array (for example, a Bayer filter). The image sensor 1014 may acquire light intensity and wavelength information captured by each imaging pixel of the image sensor 1014 and provide a set of original image data processible for the ISP unit 1040. A sensor 1020 (for example, a gyroscope) may provide a parameter (for example, a stabilization parameter) for processing of an acquired image for the ISP unit 1040 based on an interface type of the sensor 1020. An interface of the sensor 1020 may adopt a Standard Mobile Imaging Architecture (SMIA) interface, another serial or parallel camera interface or a combination of the cameras.

In addition, the image sensor 1014 may also send the original image data to the sensor 1020. The sensor 1020 may provide the original image data for the ISP unit 1040 based on the interface type of the sensor 1020, or the sensor 1020 stores the original image data in an image memory 1030.

The ISP unit 1040 processes the original image data pixel by pixel in various formats. For example, each image pixel may have a bit depth of 8, 10, 12 or 14 bits. The ISP unit 1040 may perform one or more image processing operations on the original image data and collect statistical information about the image data. The image processing operations may be executed according to the same or different bit depth accuracy.

The ISP unit 1040 may further receive the image data from the image memory 1030. For example, the interface of the sensor 1020 sends the original image data to the image memory 1030. The original image data in the image memory 1030 is provided for the ISP unit 1040 for processing. The image memory 1030 may be a part of a memory apparatus, storage device or an independent dedicated memory in the electronic device, and may include a Direct Memory Access (DMA) feature.

When receiving the original image data from an interface of the image sensor 1014 or from the interface of the sensor 1020 or from the image memory 1030, the ISP unit 1040 may perform the one or more image processing operations, for example, time-domain filtering. The processed image data may be sent to the image memory 1030 for other processing before displaying. The ISP unit 1040 may further receive the processed data from the image memory 1030 and perform image data processing in an original domain and color spaces Red, Green and Blue (RGB) and YCbCr on the processed data. The processed image data may be output to a display 1380 for a user to view and/or for further processing by a Graphics Processing Unit (GPU). In addition, output of the ISP unit 1040 may further be sent to the image memory 1030. The display 1080 may read the image data from the image memory 1030. According to an aspect of the disclosure, the image memory 1030 may be configured to implement one or more frame buffers. Moreover, the output of the ISP unit 1040 may be sent to a coder/decoder 1070 to code/decode the image data. The coded image data may be stored, and is decompressed before being displayed on the display 1080.

The action that the ISP 1040 processes the image data includes the following actions. Video Front End (VFE) processing and Camera Post Processing (CPP) are performed on the image data. The VFE processing on the image data may include correction of a contrast or brightness of the image data, modification of illumination state data recorded in a digital manner, compensation processing (for example, white balance, automatic gain control and γ correction) on the image data, filtering processing on the image data and the like. The CPP on the image data may include scaling of the image and provision of a preview frame and a recording frame for each path. The CPP may process the preview frame and the recording frame with different codecs. The image data processed by the ISP unit 1040 may be sent to a retouching module 1060 for retouching on the image before being displayed. The retouching of the retouching module 1060 on the image data may include whitening, freckle removing, buffing, face-lift, acne removing, eye widening and the like. The retouching module 1060 may be a Central Processing Unit (CPU), GPU, coprocessor or the like in a mobile terminal. The data processed by the retouching module 1060 may be sent to the coder/decoder 1070 for coding/decoding on the image data. The coded image data may be stored, and is decompressed before being displayed on the display 1080. The retouching module 1060 may also be positioned between the coder/decoder 1070 and the display 1080. That is, the retouching module retouches the image which has been formed. The coder/decoder 1070 may be the CPU, GPU, coprocessor or the like in the mobile terminal.

Statistical data determined by the ISP unit 1040 may be sent to the control logic unit 1050. For example, the statistical data may include statistical information about automatic exposure, automatic white balance, automatic focusing, scintillation detection, black level compensation, shading correction of the lens 1012 and the like of the image sensor 1014. The control logic unit 1050 may include a processor and/or microcontroller executing one or more routines (for example, firmware). The one or more routines may determine the control parameter of the imaging device 1010 and a control parameter of the ISP unit 1040 according to the received statistical data. For example, the control parameter of the imaging device 1010 may include a control parameter (for example, integral time for gain and exposure control) for the sensor 1020, a camera scintillation control parameter, a control parameter (for example, a focal length for focusing or zooming) for the lens 1012 or a combination of these parameters. The control parameter for the ISP unit may include a gain level and color correction matrix configured for automatic white balance and color regulation (for example, during RGB processing) and a shading correction parameter for the lens 1012.

The image processing technology in FIG. 10 may be used to implement the following actions.

(1) Face recognition is performed on an image to be processed to recognize a face region in the image to be processed. Facial feature recognition points in the face region are acquired.

(2) Coordinate values of the facial feature recognition point in a coordinate system are acquired.

(3) Distances between the facial feature recognition points and angles of a coordinate axis of the coordinate system relative to lines each connecting two of the facial feature recognition points are determined according to the coordinate values.

(4) A deviation angle of the face region is determined according to the distances between the facial feature recognition points and the angles of the coordinate axis relative to the lines each connecting two of the facial feature recognition points. The deviation angle is a rotation angle of the face region relative to the front face image on a plane.

(5) A retouching template corresponding to the deviation angle is acquired, and the face region is retouched according to the retouching template.

According to an aspect of the disclosure, the deviation angle includes a first angle, a second angle and a third angle.

The first angle represents a rotation angle of the face region on a first plane relative to a standard face image. The second angle represents a rotation angle of the face region on a second plane relative to the standard face image. The third angle represents a rotation angle of the face region on a third plane relative to the standard face image. Every two planes of the first plane, the second plane and the third plane are perpendicular to each other.

According to an aspect of the disclosure, the action, executed by the processor, that the retouching template corresponding to the deviation angle is acquired includes any one of the following actions.

(1) A pre-stored standard retouching template is rotated according to the deviation angle to obtain the retouching template corresponding to the deviation angle.

(2) Stored retouching templates are searched for the retouching template corresponding to the deviation angle.

(3) The deviation angle is uploaded to a server, and the retouching template corresponding to the deviation angle is received from the server.

According to an aspect of the disclosure, the action that the face region is retouched according to the retouching template includes the following action. A skin color and skin type of the face region and a sex corresponding to the face region are acquired. A retouching parameter corresponding to the face region is acquired according to the skin color, the skin type and the sex. The retouching template is regulated according to the retouching parameter. The face region is retouched according to the regulated retouching template.

According to an aspect of the disclosure, the following actions are further performed. A skin color region in the face region is recognized. Edge extraction is performed on the skin color region to acquire edge information. A first skin color region is determined according to the edge information. Image fusion is performed on the retouched face region and the first skin color region.

According to an aspect of the disclosure, the operation that the first skin color region is determined according to the edge information includes the following actions. First edge information is determined according to a shape and color corresponding to the edge information. A skin color region corresponding to the first edge information is acquired as the first skin color region. Position information of the first skin color region is recorded. The operation that image fusion is performed on the retouched face region and the first skin color region includes the following actions. A corresponding skin color region of the first skin color region in the processed face region is determined according to the position information. Fusion processing is performed on the first skin color region and the corresponding skin color region.

According to an aspect of the disclosure, before the operation that face recognition is performed on the image to be processed, the following actions are further performed. One or more eye-opened images are selected from multiple continuously shot images according to eye states in the multiple continuously shot images. When more or two eye-opened images are selected, the more or two eye-opened images are synthesized to generate a synthesized image, and the synthesized image is determined as the image to be processed. When one eye-opened image is selected, the eye-opened image is determined as the image to be processed.

Any citation of a memory, storage, a database or another medium used in the application may include non-transitory and/or transitory memories. A proper non-transitory memory may include a Read-Only Memory (ROM), a Programmable ROM (PROM), an Electrically Programmable ROM (EPROM), an Electrically Erasable Programmable ROM (EEPROM) or a flash memory. The volatile memory may include a Random Access Memory (RAM), and is used as an external high-speed buffer memory. Exemplarily but unlimitedly, the RAM may be obtained in various forms, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

The abovementioned embodiments only express some implementation modes of the application and are specifically described in detail and not thus understood as limits to the patent scope of the application. It should be pointed out that those of ordinary skilled in the art may further make a plurality of transformations and improvements without departing from the concept of the application and all of these fall within the scope of protection of the application. Therefore, the scope of protection of the patent application should be subject to the appended claims.

The invention claimed is:

1. A method for image processing, comprising:
performing face recognition on an image to be processed to recognize a face region in the image to be processed and acquire facial feature recognition points in the face region;
acquiring coordinate values of the facial feature recognition points in a coordinate system;
determining, according to the coordinate values, distances between the facial feature recognition points and angles of a coordinate axis of the coordinate system relative to lines each connecting two of the facial feature recognition points;
determining a deviation angle of the face region relative to a front face image, according to the distances between the facial feature recognition points and the angles of the coordinate axis relative to the lines each connecting two of the facial feature recognition points, the deviation angle being a rotation angle of the face region relative to the front face image on a plane; and
acquiring a retouching template corresponding to the deviation angle; and
retouching the face region according to the retouching template,
the method further comprising:
recognizing a skin color region in the face region, and performing edge extraction on the skin color region to acquire edge information;
determining a first skin color region according to the edge information; and
performing image fusion on the retouched face region and the first skin color region.

2. The method according to claim 1, wherein the deviation angle comprises:
a first angle that represents a rotation angle of the face region on a first plane relative to the front face image;
a second angle that represents a rotation angle of the face region on a second plane relative to the front face image;
a third angle that represents a rotation angle of the face region on a third plane relative to the front face image; and
wherein every two planes of the first plane, the second plane and the third plane are perpendicular to each other.

3. The method according to claim 1, wherein acquiring the retouching template corresponding to the deviation angle comprises any one of the following actions:
- rotating, according to the deviation angle, a pre-stored standard retouching template, to obtain the retouching template corresponding to the deviation angle;
- searching stored retouching templates for the retouching template corresponding to the deviation angle; or
- uploading the deviation angle to a server, and receiving, from the server, the retouching template corresponding to the deviation angle.

4. The method according to claim 1, wherein retouching the face region according to the retouching template comprises:
- acquiring a skin color and skin type of the face region and a sex corresponding to the face region;
- acquiring a retouching parameter corresponding to the face region according to the skin color, the skin type and the sex;
- regulating the retouching template according to the retouching parameter; and
- retouching the face region according to the regulated retouching template.

5. The method according to claim 1, wherein determining the first skin color region according to the edge information comprises:
- determining first edge information according to a shape and color corresponding to the edge information,
- acquiring a skin color region corresponding to the first edge information as the first skin color region,
- recording position information of the first skin color region;
- performing image fusion on the retouched face region and the first skin color region comprises:
- determining a corresponding skin color region of the first skin color region in the processed face region according to the position information, and
- performing fusion processing on the first skin color region and the corresponding skin color region.

6. The method according to claim 1, before performing face recognition on the image to be processed, further comprising:
- selecting one or more eye-opened images from a plurality of continuously shot images, according to eye states in the plurality of continuously shot images;
- when two or more eye-opened images are selected, synthesizing the two or more eye-opened images to generate a synthesized image, and determining the synthesized image as the image to be processed; and
- when one eye-opened image is selected, determining the one eye-opened image as the image to be processed.

7. An apparatus for image processing, comprising a processor and one or more modules stored on a memory and executable by the processor, the one or more modules comprising:
- a recognition module, configured to perform face recognition on an image to be processed to recognize a face region in the image to be processed;
- an acquisition module, configured to acquire facial feature recognition points in the face region and acquire coordinate values of the facial feature recognition points in a coordinate system;
- a determination module, configured to determine distances between the facial feature recognition points and angles of a coordinate axis of the coordinate system relative to lines each connecting two of the facial feature recognition points according to the coordinate values,
- the determination module being further configured to determine a deviation angle of the face region relative to a front face image according to the distances between the facial feature recognition points and the angles of the coordinate axis relative to the lines each connecting two of the facial feature recognition points, the deviation angle being a rotation angle of the face region relative to the front face image on a plane; and
- a retouching module, configured to acquire a retouching template corresponding to the deviation angle and retouch the face region according to the retouching template,
- wherein the recognition module is further configured to recognize a skin color region in the face region, and perform edge extraction on the skin color region to acquire edge information;
- the determination module is further configured to determine a first skin color region according to the edge information; and
- the retouching module is further configured to perform image fusion on the retouched face region and the first skin color region.

8. The apparatus according to claim 7, wherein the deviation angle comprises:
- a first angle that represents a rotation angle of the face region on a first plane relative to the front face image;
- a second angle that represents a rotation angle of the face region on a second plane relative to the front face image;
- a third angle that represents a rotation angle of the face region on a third plane relative to the front face image; and
- wherein every two planes of the first plane, the second plane and the third plane are perpendicular to each other.

9. The apparatus according to claim 7, wherein the retouching module is further configured to perform any one of the following actions:
- rotating, according to the deviation angle, a pre-stored standard retouching template, to obtain the retouching template corresponding to the deviation angle;
- searching stored retouching templates for the retouching template corresponding to the deviation angle; or
- uploading the deviation angle to a server, and receiving, from the server, the retouching template corresponding to the deviation angle.

10. The apparatus according to claim 7, wherein the retouching module is further configured to:
- acquire a skin color and skin type of the face region and a sex corresponding to the face region;
- acquire a retouching parameter corresponding to the face region according to the skin color, the skin type and the sex; and
- regulate the retouching template according to the retouching parameter, and retouching the face region according to the regulated retouching template.

11. The apparatus according to claim 7, wherein the determination module is further configured to: determine first edge information according to a shape and color corresponding to the edge information; acquire a skin color region corresponding to the first edge information as the first skin color region; and record position information of the first skin color region; and the retouching module is further configured to: determine a corresponding skin color region of the first skin color region in the processed face region according to the position information, and perform fusion processing on the first skin color region and the corresponding skin color region.

12. The apparatus according to claim 7, wherein the one or more modules further comprises a selection module configured to:
    select one or more eye-opened images from a plurality of continuously shot images, according to eye states in the plurality of continuously shot images;
    when two or more eye-opened images are selected, synthesize the two or more eye-opened images to generate a synthesized image, and determine the synthesized image as the image to be processed; and
    when one eye-opened image is selected, determine the eye-opened image as the image to be processed.

13. A non-transitory computer-readable storage medium, storing a computer program, which, when executed by a processor, causes the processor to implement a method comprising the following actions:
    performing face recognition on an image to be processed to recognize a face region in the image to be processed, and acquire facial feature recognition points in the face region;
    acquiring coordinate values of the facial feature recognition points in a coordinate system;
    determining distances between the facial feature recognition points and angles of a coordinate axis of the coordinate system relative to lines each connecting two of the facial feature recognition points according to the coordinate values;
    determining a deviation angle of the face region relative to a front face image, according to the distances between the facial feature recognition points and the angles of the coordinate axis relative to the lines each connecting two of the facial feature recognition points, the deviation angle being a rotation angle of the face region relative to the front face image on a plane; and
    acquiring a retouching template corresponding to the deviation angle, and retouching the face region according to the retouching template,
    wherein the method further comprises:
    recognizing a skin color region in the face region, and performing edge extraction on the skin color region to acquire edge information;
    determining a first skin color region according to the edge information; and
    performing image fusion on the retouched face region and the first skin color region.

14. The non-transitory computer-readable storage medium according to claim 13, wherein the deviation angle comprises:
    a first angle that represents a rotation angle of the face region on a first plane relative to the front face image;
    a second angle that represents a rotation angle of the face region on a second plane relative to the front face image;
    a third angle that represents a rotation angle of the face region on a third plane relative to the front face image; and
    wherein every two planes of the first plane, the second plane and the third plane are perpendicular to each other.

15. The non-transitory computer-readable storage medium according to claim 13, wherein acquiring the retouching template corresponding to the deviation angle comprises any one of the following actions:
    rotating, according to the deviation angle, a pre-stored standard retouching template, to obtain the retouching template corresponding to the deviation angle;
    searching stored retouching templates for the retouching template corresponding to the deviation angle; or
    uploading the deviation angle to a server, and receiving, from the server, the retouching template corresponding to the deviation angle.

16. The non-transitory computer-readable storage medium according to claim 13, wherein retouching the face region according to the retouching template comprises:
    acquiring a skin color and skin type of the face region and a sex corresponding to the face region;
    acquiring a retouching parameter corresponding to the face region according to the skin color, the skin type and the sex; and
    regulating the retouching template according to the retouching parameter, and retouching the face region according to the regulated retouching template.

17. The non-transitory computer-readable storage medium according to claim 13, wherein, before performing face recognition on the image to be processed, further comprising:
    selecting one or more eye-opened images from a plurality of continuously shot images, according to eye states in the plurality of continuously shot images;
    when two or more eye-opened images are selected, synthesizing the two or more eye-opened images to generate a synthesized image, and determining the synthesized image as the image to be processed; and
    when one eye-opened image is selected, determining the one eye-opened image as the image to be processed.

18. The non-transitory computer-readable storage medium according to claim 13, wherein determining the first skin color region according to the edge information comprises:
    determining first edge information according to a shape and color corresponding to the edge information,
    acquiring a skin color region corresponding to the first edge information as the first skin color region,
    recording position information of the first skin color region;
    performing image fusion on the retouched face region and the first skin color region comprises:
    determining a corresponding skin color region of the first skin color region in the processed face region according to the position information, and
    performing fusion processing on the first skin color region and the corresponding skin color region.

* * * * *